Oct. 19, 1948.   W. J. ROBERTS   2,451,577
ENDLESS CONVEYER EGG-CANDLING DEVICE
Filed May 10, 1946
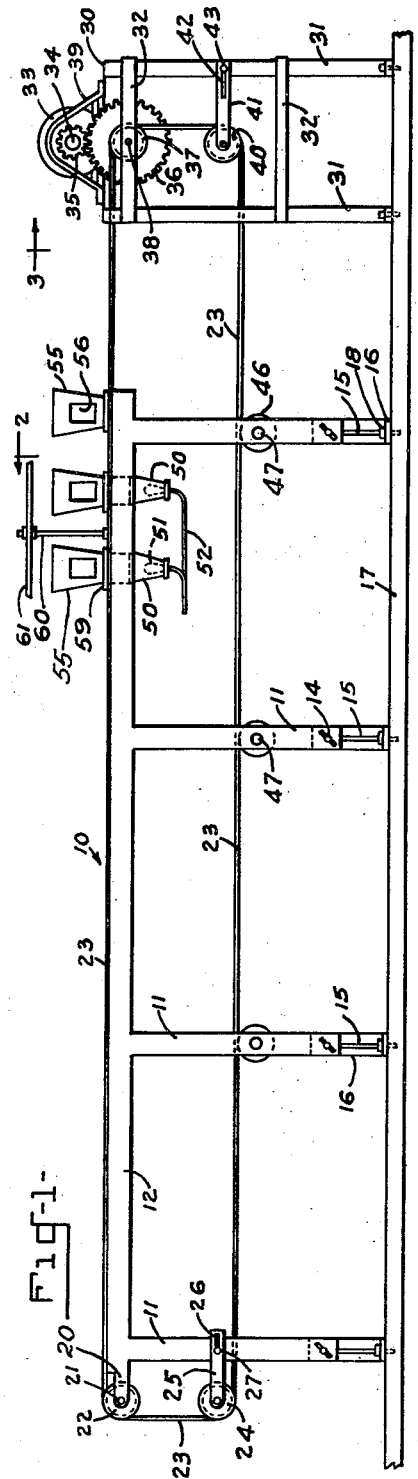
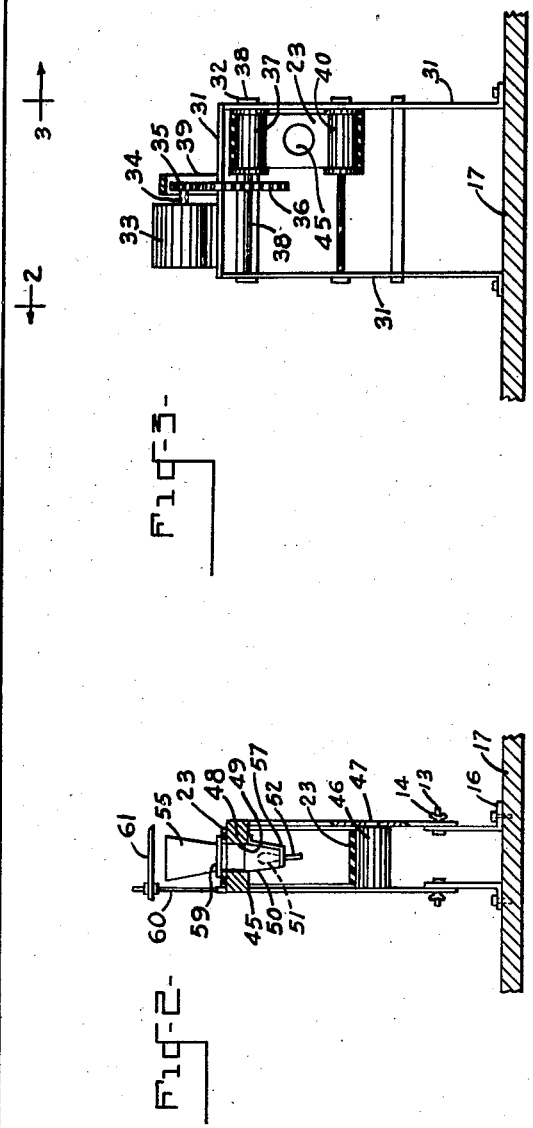
INVENTOR
Wesley J. Roberts Patented Oct. 19, 1948

2,451,577

UNITED STATES PATENT OFFICE 2,451,577

ENDLESS CONVEYER EGG-CANDLING DEVICE

Wesley J. Roberts, Hot Springs, Ark.

Application May 10, 1946, Serial No. 668,700

1 Claim. (Cl. 88—14.5)

This invention relates to an egg candling device, and more particularly to a mechanical device adapted to facilitate the inspection of eggs by candling.

A primary object of this invention is the provision of an apparatus including means whereby eggs may be moved over or past a light source at a speed sufficient to expedite the handling of the eggs, but sufficiently slow to insure proper inspection of each individual egg.

An additional object of the invention is the provision of such a device provided with power means for moving the eggs whereby the inspector's attention may be concentrated exclusively on the proper candling of the eggs.

A further object of the invention is the provision of such a device which may be readily adjusted as to a convenient height for the operator.

Still another object of the invention is the provision of means in association with such a device including an endless belt whereby a plurality of eggs may be positioned thereon as rapidly as is consistent with proper inspection thereof, and moved past the light source, then removed from the belt and repacked as may be necessary.

Other objects reside in the combinations of elements, arrangements of parts, and features of construction, all as will be more fully pointed out hereinafter and shown in the accompanying drawings, wherein there is disclosed a preferred embodiment of this inventive concept.

In the drawings:

Figure 1 is a side elevational view of one form of device embodying features of the instant inventive concept.

Figure 2 is a sectional view taken substantially along the line 2—2 of Figure 1, as viewed in the direction indicated by the arrows.

Figure 3 is a sectional view taken substantially along the line 3—3 of Figure 1, as viewed in the direction indicated by the arrows.

Similar reference characters refer to similar parts throughout the several views of the drawings.

Having reference now to the drawings, there is generally indicated at 10 a frame including uprights 11 and spaced top bars 12. The uprights 11 carry screws 13 provided with wing nuts 14, engageable in slotted apertures 15 in base members 16 comprised of angle iron, and secured to the flooring 17, as by means of bolts 18, or the like.

One end of each of the members 12 is provided with a tongue 20 between which tongues extends an axle 21 carrying a roller 22 over which passes an endless belt 23. The end members 11 also carry an additional roller 24 carried on tongues 25 including slots 26 secured, as by bolts 27, passed through the slots 26, to each upright 11. At the opposite end of the frame is provided a motor supporting plate 30 adjacent uprights 31 carrying the plate and connected thereto, as by reinforcing strips 32. Plate 30 has mounted thereon a motor 33 including a drive shaft 34 which drives through suitable gears 35 and 36 a drive roller 37 journaled in the uppermost of the transverse members 32, as on an axle 38. A shield 39 is provided for the gearing.

A lower roller 40 is provided in alignment with the roller 24 and mounted on tongues 41 provided with slots 42 through which pass bolts 43 adjustably securing the tongues and hence the roller to the outermost uprights 31. As best shown in Figure 3, the belt 23 is provided with a plurality of aligned spaced apertures 45 of a diameter slightly less than the lesser diameter of an egg, whereby an egg may be positioned directly therein if desired.

Suitable supporting rollers 46 are provided between each pair of uprights 11 journaled, as on axles 47, for the support of the belt 23.

The upper portion of the belt 23 is adapted to pass over a top plate 48 provided at an intermediate portion with a longitudinal slot 49 which overlies a light housing 50, or a plurality of light housings, as may be desired. Bulbs 51 are positioned in each housing 50 and supplied with current through a wire 52 extending from any suitable source.

In the preferred embodiment of the invention cups 55 are provided having apertures or transparencies 56 in the sides thereof, as well as apertures in the base thereof through which the light may pass. The bases may be enlarged, as at 59, if desired, in order to seat firmly on the belt 23.

An upright 60 supports a shade or reflector 61 positioned directly over the slot 49.

When using the apparatus, the eggs, previously positioned in cups or containers 55, are fed on the belt 23 adjacent the motor 33 and aligned over the apertures 45.

As the belt revolves about the rollers 22, 24, 46, and 40, driven by the power roller 37, the eggs are successively passed over the lights 51, which, it may be here pointed out, are supported in the cups 50, as retained in position by depending brackets 57 suspended from the under side of the member 48, the speed being of a degree to permit thorough inspection by an inspector seated adjacent the light source. The arrangement is such that when an egg on belt 23 registers with the light from lamp 51, this light will pass upwardly through the egg in turn passing in modified form up to reflecting shade 61 and then the light will again be reflected down into the cup 55 beneath. As the wall of each cup is upwardly and outwardly inclined, the inner surface thereof also acts as a reflector and concentrates the light back upon the egg involved which may be viewed from the side and slightly from above through aperture 56. The resulting appearance of the egg is a direct index of its condition easily recognized by an experienced candler.

Obviously, if desired, the size of the apparatus may be varied, as may the dimensions and size of the apertures 45, in such manner that trays, or pluralities of eggs, may be simultaneously inspected, if desired, although it is of importance that each egg be individually viewed over a light source.

From the foregoing it will now be seen that there is herein provided a device which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein may be interpreted merely as illustrative and not in a limiting sense.

I claim:

In an egg-candling device comprising a supporting table having a longitudinal slot therein and a driven conveyor belt movable over the supporting table longitudinally above the slot and having a series of spaced apertures therein individually serving as receptacles for receiving and conveying eggs above the slot, the features including an upwardly-directed lamp housing supported beneath said table below the slot therein, a lamp in the lamp housing directing its rays upwardly through said slot, a plurality of upwardly-flaring cups adapted to be positioned on said conveyor belt to register with the individual apertures therein in succession, said cups being adapted to surround the eggs individually carried by said apertures, and a viewing window in the side wall of each upwardly-flaring cup, and a reflector adjustably supported over said lamp housing and lamp above the path of travel of said upwardly-flaring cups on said conveyor belt.

WESLEY J. ROBERTS.

REFERENCES CITED

The following references are of record in the file of this patent:

UNITED STATES PATENTS

| Number | Name | Date |
|---|---|---|
| 1,816,483 | Heaton | July 28, 1931 |
| 2,016,789 | Neuhaus | Oct. 8, 1935 |